United States Patent

Kanamaru

[11] Patent Number: 5,940,505
[45] Date of Patent: Aug. 17, 1999

[54] INFORMATION RECORDING METHOD AND APPARATUS, FUNCTION RECORDING METHOD AND APPARATUS, AND INFORMATION REPRODUCING METHOD AND APPARATUS

[75] Inventor: Hitoshi Kanamaru, Tokyo-to, Japan

[73] Assignee: Pioneer Electronic Corporation, Japan

[21] Appl. No.: 08/689,112

[22] Filed: Jul. 30, 1996

[30] Foreign Application Priority Data

Jul. 31, 1995 [JP] Japan .................................. P07-195596

[51] Int. Cl.⁶ ........................................................ H04L 9/32
[52] U.S. Cl. ........................ 380/4; 380/5; 380/9; 380/20; 380/19
[58] Field of Search ............................. 380/9, 4, 5, 19, 380/20

[56] References Cited

U.S. PATENT DOCUMENTS

| | | | |
|---|---|---|---|
| 4,644,493 | 2/1987 | Chandra et al. | 364/900 |
| 5,323,244 | 6/1994 | Yamaguchi et al. | 358/335 |
| 5,406,627 | 4/1995 | Thompson et al. | 380/20 |
| 5,418,852 | 5/1995 | Itami et al. | 380/4 |
| 5,546,461 | 8/1996 | Ibaraki et al. | 380/20 |
| 5,737,415 | 4/1998 | Akiyama et al. | 380/4 |
| 5,796,824 | 8/1998 | Hasebe et al. | 380/4 |

*Primary Examiner*—Gail O. Hayes
*Assistant Examiner*—Ho S. Song
*Attorney, Agent, or Firm*—Finnegan, Henderson, Farabow, Garrett & Dunner, L.L.P.

[57] ABSTRACT

A record signal corresponding to record information to be recorded to a record medium is scrambled, and the scrambled record signal is recorded to the record medium. The information recording method is provided with: generating a scramble function to scramble the record signal in correspondence with a record medium identification code, which is set in advance to identify the record medium; scrambling the record signal by use of the generated scramble function and outputting the scrambled record signal; recording the scrambled record signal and the record medium identification code corresponding to the scrambled record signal to the record medium; generating an inverse-scramble function to decipher the scrambled record signal on the basis of the generated scramble function; and outputting the generated inverse-scramble function and the record medium identification code corresponding to the generated inverse-scramble function as one set to the external.

16 Claims, 8 Drawing Sheets

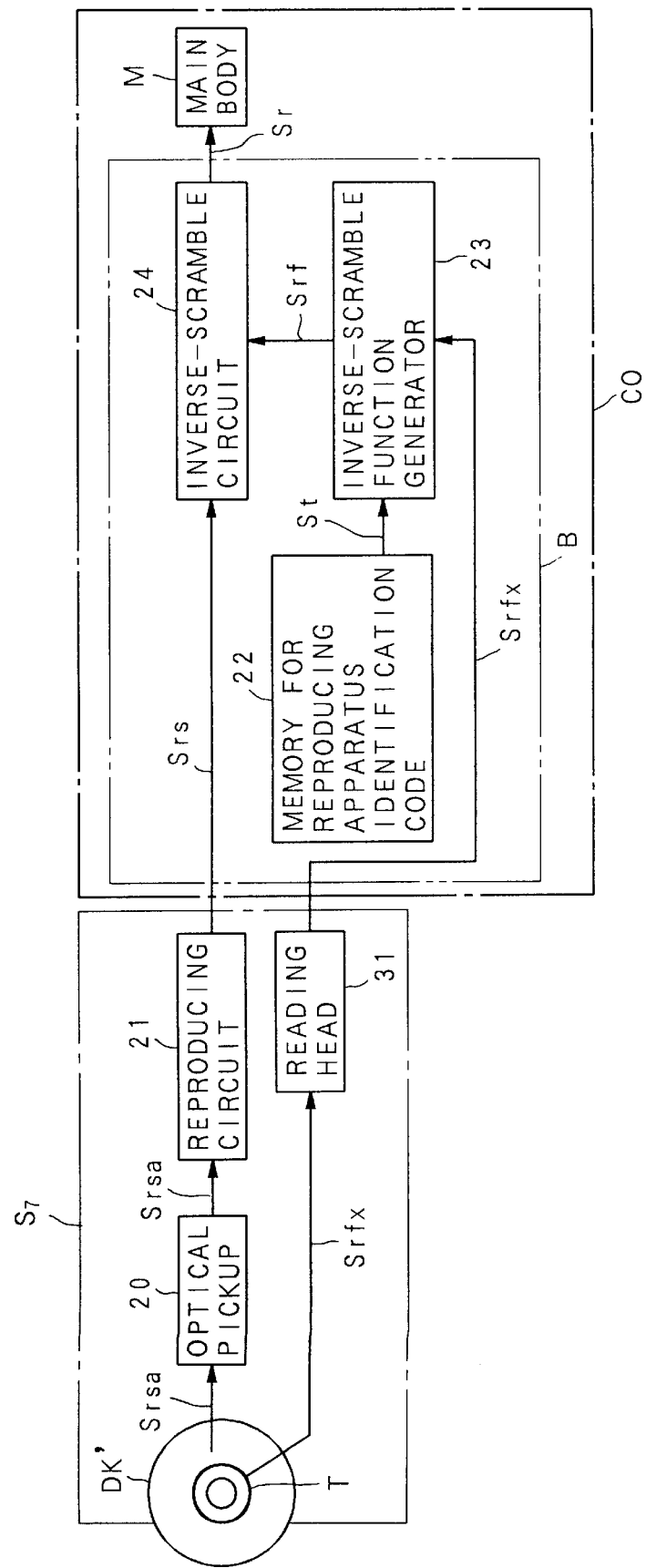

INFORMATION RECORDING METHOD AND APPARATUS, FUNCTION RECORDING METHOD AND APPARATUS, AND INFORMATION REPRODUCING METHOD AND APPARATUS

BACKGROUND OF THE INVENTION

1. Field of the Invention

The present invention relates to an information recording method and apparatus, a function recording method and apparatus, and an information reproducing method and apparatus, for identifying and specifying an information reproducing apparatus among a plurality of information reproducing apparatuses, such as optical disk players, which is allowed to reproduce record information such as audio and video information, digital information for a computer etc., recorded on a record medium such as a CD (Compact Disk), an LVD (Laser Vision Disk), a CD-ROM (Compact Disk—Read Only Memory) and so on.

2. Description of the Related Art

There is a scrambling method for identifying and specifying the information reproducing apparatus which is allowed or prohibited to reproduce the record information.

This scrambling method is such a recording method that the inversion and non-inversion of the bit arrangements constituting the record signal are randomly performed (i.e. scrambled) when the digitized record signal is recorded to the optical disk and the like. The scrambling of the bit arrangements is performed according to a certain random rule.

Then, when reproducing the scrambled record signal, the scrambling of the record signal is released by reproducing the scrambled record signal through a scrambling releasing circuit, so that the record signal can be reproduced normally. In this case, if the scrambled record signal is reproduced by a reproducing apparatus which is not provided with the scramble releasing circuit, the video image can be hardly seen if the record signal is the video signal, or only the noise can be sound-outputted if the record signal is the audio signal.

According to the above mentioned scrambling method, since the reproduction of the record signal can be performed only by the reproducing apparatus having the scramble releasing circuit, it is possible to identify and specify the reproducing apparatus allowed or prohibited to reproduce the record signal.

However, according to the above mentioned scrambling method, as long as the scramble releasing circuit exists, the normal reproduction can be performed by any reproducing apparatus. Namely, if the scramble releasing apparatus having the scramble releasing circuit is connected to the ordinary reproducing apparatus (which does not have the scramble releasing circuit), it is possible for any type of reproducing apparatus to reproduce the record signal. Thus, it is not possible to efficiently and reliably identify and specify the reproducing apparatus allowed or prohibited to reproduce the record signal.

SUMMARY OF THE INVENTION

It is therefore an object of the present invention to provide an information recording method and apparatus, a function recording method and apparatus, and an information reproducing method and apparatus, which can increase the efficiency and reliability for identifying and specifying the information reproducing apparatus allowed to reproduce the record signal.

The above mentioned object of the present invention can be achieved by an information recording method of scrambling a record signal corresponding to record information to be recorded to a record medium and recording the scrambled record signal to the record medium. The information recording method is provided with the steps of: generating a scramble function to scramble the record signal in correspondence with a record medium identification code, which is set in advance to identify the record medium; scrambling the record signal by use of the generated scramble function and outputting the scrambled record signal; recording the scrambled record signal and the record medium identification code corresponding to the scrambled record signal to the record medium; generating an inverse-scramble function to decipher the scrambled record signal on the basis of the generated scramble function; and outputting the generated inverse-scramble function and the record medium identification code corresponding to the generated inverse-scramble function as one set to the external.

According to the information recording method of the present invention, a scramble function to scramble the record signal is generated in correspondence with a record medium identification code, which is set in advance to identify the record medium, by the scramble function generating step. Then, the record signal is scrambled by use of the generated scramble function, and the scrambled record signal is outputted by the scrambling step. Then, the scrambled record signal and the record medium identification code corresponding to the scrambled record signal is recorded to the record medium by the recording step. Along with this, an inverse-scramble function to decipher the scrambled record signal is generated on the basis of the generated scramble function by the inverse-scramble function generating step. Then, the generated inverse-scramble function and the record medium identification code corresponding to the generated inverse-scramble function as one set is outputted to the external by the outputting step.

Thus, the inverse-scramble function corresponding to the record medium identification code can be obtained at the receiving side (e.g. a function recording apparatus) of receiving the inverse-scramble function and the record medium identification code as one set outputted by the information recording method of the present invention. Further, a modified inverse-scramble function, which is based on the inverse-scramble function and a reproducing apparatus identification code, which identifies the reproducing apparatus allowed to reproduce the record signal, can be recorded to the record medium or another record medium there. Then, by constructing an information reproducing apparatus such that the inverse-scramble function can be generated from the modified inverse-scramble function recorded to the record medium (e.g. an optical disk) or another record medium (e.g. an IC card) only by a peculiar information reproducing apparatus to which the reproducing apparatus identification code is registered in advance, the scrambled record signal can be deciphered and the record information can be reproduced only by this peculiar information reproducing apparatus, according to the present invention.

In one aspect of the information recording method of the present invention, the information recording method is further provided with the step of generating the record medium identification code, in correspondence with which the scramble function is generated by the scramble function generating step.

According to this aspect, the record medium identification code is generated by the record medium identification code generating step. Then, the scramble function is generated in correspondence with this generated record medium identification code, by the scramble function generating step. Thus, with respect to various types of record media to which various types of record signals are recorded, the record medium identification code can be efficiently and easily generated.

In another aspect of the information recording method of the present invention, in the outputting step, the generated inverse-scramble function and the record medium identification code as one set are transmitted through a communication line.

According to this aspect, since the inverse-scramble function and the record medium identification code are transmitted through a communication line, the receiving side (e.g. the function recording apparatus) can receive the transmitted inverse-scramble function and the record medium identification code through the communication line such as a telephone line.

The above object of the present invention can be also achieved by a first function recording method. The first function recording method is provided with: inputting a reproducing apparatus identification code to identify a reproducing apparatus allowed to reproduce a record signal, which corresponds to record information, is scrambled by use of a scramble function and is recorded on a first record medium; generating a modified inverse-scramble function on the basis of an inverse-scramble function, which is generated in correspondence with the scramble function and is inputted from the external to decipher the scrambled record signal, and the reproducing apparatus identification code, which is inputted by the inputting device; and recording the generated modified inverse-scramble function to a second record medium.

According to the first function recording method, a reproducing apparatus identification code to identify a reproducing apparatus allowed to reproduce the record signal is inputted by the inputting step. Here, the record signal corresponds to record information, is scrambled by use of a scramble function and is recorded on a first record medium. Then, a modified inverse-scramble function is generated on the basis of an inverse-scramble function and the reproducing apparatus identification code by the modified inverse-function generating step. Here, the inverse-scramble function is generated in correspondence with the scramble function and is inputted from the external to decipher the scrambled record signal. For example, the inverse function is transmitted from the aforementioned information recording apparatus of the present invention through the communication line. On the other hand, the reproducing apparatus identification code is inputted by the inputting step. Finally, the generated modified inverse-scramble function is recorded to a second record medium by the recording step. The second record medium may be an IC (Integrated Circuit) card, which is easy for the consumer to bring it back home, for example.

Thus, by constructing an information reproducing apparatus such that the inverse-scramble function can be generated from the modified inverse-scramble function recorded to the second record medium only by a peculiar information reproducing apparatus to which the reproducing apparatus identification code is registered in advance, the scrambled record signal can be deciphered and the record information can be reproduced only by this peculiar information reproducing apparatus, according to the present invention.

In one aspect of the first function recording method, the first function recording method is further provided with the steps of: receiving and storing a plurality of inverse-scramble functions transmitted from the external; and reading a record medium identification code, which is recorded on the first record medium to identify the first record medium, from the first record medium, wherein one of the inverse-scramble functions corresponding to the first record medium is selected in correspondence with the read record medium identification code, based on which the modified inverse-scramble function is generated by the modified inverse-scramble function generating step.

According to this aspect, a plurality of inverse-scramble functions transmitted from the external are received and stored by the receiving and storing step. Then, a record medium identification code, which is recorded on the first record medium to identify the first record medium, is read from the first record medium by the reading step. Then, in the modified inverse-scramble function generating step, one of the inverse-scramble functions corresponding to the first record medium is selected in correspondence with the read record medium identification code, and the modified inverse-scramble function is generated based on this selected one of the inverse-scramble functions.

The above object of the present invention can be also achieved by a second function recording method. The second function recording method is provided with: inputting a reproducing apparatus identification code to identify a reproducing apparatus allowed to reproduce a record signal, which corresponds to record information, is scrambled by use of a scramble function and is recorded on a record medium; generating a modified inverse-scramble function on the basis of an inverse-scramble function, which is generated in correspondence with the scramble function and is inputted from the external to decipher the scrambled record signal, and the reproducing apparatus identification code, which is inputted by the inputting step; and recording the generated modified inverse-scramble function to the record medium in addition to the scrambled record signal.

According to the second function recording method, a reproducing apparatus identification code to identify a reproducing apparatus allowed to reproduce the record signal is inputted by the inputting step. Here, the record signal corresponds to record information, is scrambled by use of a scramble function and is recorded on the record medium. Then, a modified inverse-scramble function is generated on the basis of an inverse-scramble function and the reproducing apparatus identification code by the modified inverse-function generating step. Here, the inverse-scramble function is generated in correspondence with the scramble function and is inputted from the external to decipher the scrambled record signal. Finally, the generated modified inverse-scramble function is recorded to the record medium by the recording step.

Thus, by constructing an information reproducing apparatus such that the inverse-scramble function can be generated from the modified inverse-scramble function recorded to the record medium only by a peculiar information reproducing apparatus to which the reproducing apparatus identification code is registered in advance, the scrambled record signal can be deciphered and the record information can be reproduced only by this peculiar information reproducing apparatus, according to the present invention.

In one aspect of the second function recording method, the second function recording method is further provided with the steps of: receiving and storing a plurality of inverse-scramble functions transmitted from the external; and reading a record medium identification code, which is recorded on the record medium to identify the record medium, from the record medium, wherein one of the inverse-scramble functions corresponding to the record medium is selected in correspondence with the read record medium identification code, based on which the modified inverse-scramble function is generated by the modified inverse-scramble function generating step.

According to this aspect, a plurality of inverse-scramble functions transmitted from the external are received and stored by the receiving and storing step. Then, a record medium identification code, which is recorded on the record medium to identify the record medium, is read from the record medium by the reading step. Then, in the modified inverse-scramble function generating step, one of the inverse-scramble functions corresponding to the record medium is selected in correspondence with the read record medium identification code, and the modified inverse-scramble function is generated based on this selected one of the inverse-scramble functions.

The above object of the present invention can be also achieved by a first information reproducing method of reproducing a record signal, which corresponds to record information and is scrambled by a scramble function to be a scrambled record signal recorded on a first record medium. The first information reproducing method is provided with the steps of: detecting the scrambled record signal from the first record medium; reading a modified inverse-scramble function from a second record medium, on which the modified inverse-scramble function, which is generated by use of an inverse-scramble function to decipher the scrambled record signal and a reproducing apparatus identification code to identify an information reproducing apparatus allowed to reproduce the record signal, is recorded; generating the inverse-scramble function on the basis of the modified inverse-scramble function which is read by the reading step, and the reproducing apparatus identification code, which is stored in a memory in advance; and deciphering the detected scrambled record signal by use of the generated inverse-scramble function to output the record signal.

According to the first information reproducing method of the present invention, the scrambled record signal is detected from the first record medium by the detecting step. On the other hand, a modified inverse-scramble function is read from a second record medium by the reading step. Here, on the second record medium, the modified inverse-scramble function is recorded. The second record medium maybe an IC card, for example. The modified inverse-scramble function is generated by use of an inverse-scramble function to decipher the scrambled record signal and a reproducing apparatus identification code to identify an information reproducing apparatus allowed to reproduce the record signal. Then, the inverse-scramble function is generated on the basis of the modified inverse-scramble function and the reproducing apparatus identification code, by the inverse-scramble function generating step. Here, the modified inverse-scramble function is read by the reading step, while the reproducing apparatus identification code is stored in a memory in advance. Finally, the detected scrambled record signal is deciphered by use of the generated inverse-scramble function by the deciphering step, and the record signal is outputted.

Thus, since the inverse-scramble function can be generated from the modified inverse-scramble function recorded to the second record medium only by a peculiar information reproducing apparatus to which the reproducing apparatus identification code is stored in the memory in advance, the scrambled record signal can be deciphered and the record information can be reproduced only by this peculiar information reproducing apparatus, according to the present invention.

The above object of the present invention can be also achieved by a second information reproducing method of reproducing a record signal, which corresponds to record information and is scrambled by a scramble function to be a scrambled record signal recorded on a record medium. The second information reproducing method is provided with the steps of: detecting the scrambled record signal from the record medium; reading a modified inverse-scramble function from the record medium, on which the modified inverse-scramble function, which is generated by use of an inverse-scramble function to decipher the scrambled record signal and a reproducing apparatus identification code to identify an information reproducing apparatus allowed to reproduce the record signal, is recorded; generating the inverse-scramble function on the basis of the modified inverse-scramble function which is read by the reading step, and the reproducing apparatus identification code, which is stored in a memory in advance; and deciphering the detected scrambled record signal by use of the generated inverse-scramble function to output the record signal.

According to the second information reproducing method of the present invention, the scrambled record signal is detected from the record medium by the detecting step. On the other hand, a modified inverse-scramble function is read from the record medium by the reading step. Here, on the record medium, the modified inverse-scramble function is recorded in addition to the scrambled record signal. The modified inverse-scramble function is generated by use of an inverse-scramble function to decipher the scrambled record signal and a reproducing apparatus identification code to identify an information reproducing apparatus allowed to reproduce the record signal. Then, the inverse-scramble function is generated on the basis of the modified inverse-scramble function and the reproducing apparatus identification code, by the inverse-scramble function generating step. Here, the modified inverse-scramble function is read by the reading step, while the reproducing apparatus identification code is stored in a memory in advance. Finally, the detected scrambled record signal is deciphered by use of the generated inverse-scramble function by the deciphering step, and the record signal is outputted.

Thus, since the inverse-scramble function can be generated from the modified inverse-scramble function recorded to the record medium only by a peculiar information reproducing apparatus to which the reproducing apparatus identification code is stored in the memory in advance, the scrambled record signal can be deciphered and the record information can be reproduced only by this peculiar information reproducing apparatus, according to the present invention.

The above object of the present invention can be also achieved by an information recording apparatus for scrambling a record signal corresponding to record information to be recorded to a record medium and recording the scrambled record signal to the record medium. The information recording apparatus is provided with: a scramble function generating device for generating a scramble function to scramble the record signal in correspondence with a record medium identification code, which is set in advance to identify the record medium; a scrambling device for scrambling the record signal by use of the generated scramble function and outputting the scrambled record signal; a recording device for recording the scrambled record signal and the record medium identification code corresponding to the scrambled record signal to the record medium; an inverse-scramble function generating device for generating an inverse-scramble function to decipher the scrambled record signal on the basis of the generated scramble function; and an outputting device for outputting the generated inverse-scramble function and the record medium identification code corresponding to the generated inverse-scramble function as one set to the external.

According to the information recording apparatus of the present invention, the aforementioned information recording method of the present invention can be efficiently and certainly performed.

In one aspect of the information recording apparatus of the present invention, the information recording apparatus is further provided with a record medium identification code generating device for generating the record medium identification code, in correspondence with which the scramble function is generated by the scramble function generating device.

In another aspect of the information recording apparatus of the present invention, the outputting device is provided with a transmitting device for transmitting the generated inverse-scramble function and the record medium identification code as one set through a communication line.

The above object of the present invention can be also achieved by a first function recording apparatus. The first function recording apparatus is provided with: an inputting device for inputting a reproducing apparatus identification code to identify a reproducing apparatus allowed to reproduce a record signal, which corresponds to record information, is scrambled by use of a scramble function and is recorded on a first record medium; a modified inverse-scramble function generating device for generating a modified inverse-scramble function on the basis of an inverse-scramble function, which is generated in correspondence with the scramble function and is inputted from the external to decipher the scrambled record signal, and the reproducing apparatus identification code, which is inputted by the inputting device; and a recording device for recording the generated modified inverse-scramble function to a second record medium. The second record medium may be an IC card, for example.

According to the first function recording apparatus of the present invention, the aforementioned first function recording method of the present invention can be efficiently and certainly performed.

In one aspect of the first function recording apparatus of the present invention, the first function recording apparatus is further provided with: a memory device for receiving and storing a plurality of inverse-scramble functions transmitted from the external; and a reading device for reading a record medium identification code, which is recorded on the first record medium to identify the first record medium, from the first record medium, wherein one of the inverse-scramble functions stored in the memory device corresponding to the first record medium is selected in correspondence with the read record medium identification code, based on which the modified inverse-scramble function is generated by the modified inverse-scramble function generating device.

The above object of the present invention can be also achieved by a second function recording apparatus. The second function recording apparatus is provided with: an inputting device for inputting a reproducing apparatus identification code to identify a reproducing apparatus allowed to reproduce a record signal, which corresponds to record information, is scrambled by use of a scramble function and is recorded on a record medium; a modified inverse-scramble function generating device for generating a modified inverse-scramble function on the basis of an inverse-scramble function, which is generated in correspondence with the scramble function and is inputted from the external to decipher the scrambled record signal, and the reproducing apparatus identification code, which is inputted by the inputting device; and a recording device for recording the generated modified inverse-scramble function to the record medium in addition to the scrambled record signal.

According to the second function recording apparatus of the present invention, the aforementioned second function recording method of the present invention can be efficiently and certainly performed.

In one aspect of the second function recording apparatus of the present invention, the second function recording apparatus is further provided with: a memory device for receiving and storing a plurality of inverse-scramble functions transmitted from the external; and a reading device for reading a record medium identification code, which is recorded on the record medium to identify the record medium, from the record medium, wherein one of the inverse-scramble functions stored in the memory device corresponding to the record medium is selected in correspondence with the read record medium identification code, based on which the modified inverse-scramble function is generated by the modified inverse-scramble function generating device.

The above object of the present invention can be also achieved by a first information reproducing apparatus for reproducing a record signal, which corresponds to record information and is scrambled by a scramble function to be a scrambled record signal recorded on a first record medium. The first information reproducing apparatus is provided with: a detecting device for detecting the scrambled record signal from the first record medium; a reading device for reading a modified inverse-scramble function from a second record medium, on which the modified inverse-scramble function, which is generated by use of an inverse-scramble function to decipher the scrambled record signal and a reproducing apparatus identification code to identify an information reproducing apparatus allowed to reproduce the record signal, is recorded; a memory for storing the reproducing apparatus identification code; an inverse-scramble function generating device for generating the inverse-scramble function on the basis of the modified inverse-scramble function, which is read by the reading device, and the reproducing apparatus identification code, which is stored in the memory; and deciphering the detected scrambled record signal by use of the generated inverse-scramble function to output the record signal. The second record medium may be an IC card, for example.

According to the first information reproducing apparatus of the present invention, the aforementioned first information reproducing method of the present invention can be efficiently and certainly performed.

The above object of the present invention can be also achieved by a second information reproducing apparatus for reproducing a record signal, which corresponds to record information and is scrambled by a scramble function to be a scrambled record signal recorded on a record medium. The second information reproducing apparatus is provided with: a detecting device for detecting the scrambled record signal from the record medium; a reading device for reading a modified inverse-scramble function from the record medium, on which the modified inverse-scramble function, which is generated by use of an inverse-scramble function to decipher the scrambled record signal and a reproducing apparatus identification code to identify an information reproducing apparatus allowed to reproduce the record signal, is recorded in addition to the scrambled record signal; a memory for storing the reproducing apparatus identification code; an inverse-scramble function generating device for generating the inverse-scramble function on the basis of the modified inverse-scramble function, which is read by the reading device, and the reproducing apparatus identification code, which is stored in the memory; and deciphering the detected scrambled record signal by use of the generated inverse-scramble function to output the record signal.

According to the second information reproducing apparatus of the present invention, the aforementioned second information reproducing method of the present invention can be efficiently and certainly performed.

As described above, identifying and specifying the information reproducing apparatus allowed to reproduce the record signal can be efficiently and reliably performed according to the present invention.

The nature, utility, and further features of this invention will be more clearly apparent from the following detailed description with respect to preferred embodiments of the invention when read in conjunction with the accompanying drawings briefly described below.

BRIEF DESCRIPTION OF THE DRAWINGS

FIG. 7 is a block diagram of an information reproducing apparatus and a computer in a fourth embodiment of the present invention.

DETAILED DESCRIPTION OF THE PREFERRED EMBODIMENTS

Figure 1:
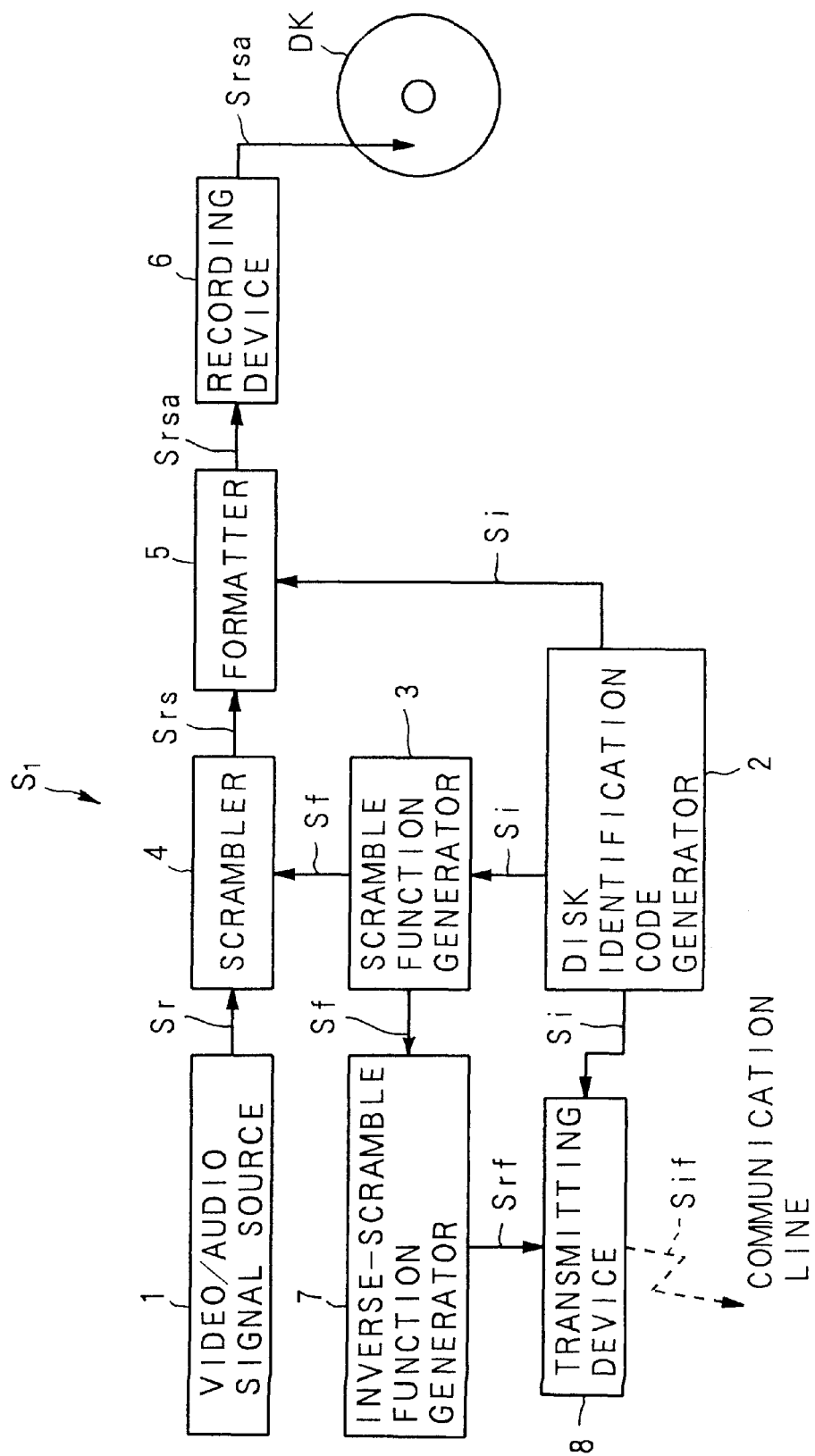
FIG. 1 is a block diagram of an information recording apparatus in a first embodiment of the present invention.

Referring to the accompanying drawings, embodiments of the present invention will be now explained.
(I) First Embodiment A first embodiment of the present invention will be explained with referring to FIGS. 1 to 3. In the first embodiment, the present invention is applied to identify a reproducing apparatus for reproducing a rental optical disk, on which video and audio information is recorded and which is rented to a consumer in the so-called rental business, in order to prevent the consumer from illegally copying the rental optical disk.
(I-1) Information Recording Apparatus in the First Embodiment FIG. 1 shows an information recording apparatus of the first embodiment. This information recording apparatus is constructed to record the record information including video and radio information and is practically installed to a production department for producing the optical disk on which the record information is recorded in the distribution process of the optical disk.

In FIG. 1, an information recording apparatus S1 of the present embodiment is provided with a video and audio signal source 1, a disk identification code generator 2, a scramble function generator 3, a scrambler 4, a formatter 5, a recording device 6, an inverse-scramble function generator 7 and a transmitting device 8.

The video and audio signal source 1 is constructed to output a record signal Sr including a video signal and an audio signal to be recorded onto an optical disk DK as a record medium. The disk identification code generator 2 is constructed to generate a disk identification code to identify the optical disk DK, to which the record signal Sr is to be recorded from other optical disks, and output a disk identification code signal Si indicating the generated disk identification code. The scramble function generator 3 is constructed to generate a scramble function to scramble the record signal Sr, on the basis of the disk identification code indicated by the disk identification code signal Si, and output a scramble function signal Sf indicating the generated scramble function.

The scrambler 4 is constructed to scramble the record signal Sr by use of the scramble function indicated by the scramble function signal Sf, and output a scrambled record signal Srs. The formatter 5 generates a code multiplexed scrambled record signal Srsa by multiplexing the disk identification code signal Si with respect to the scrambled record signal Srs, such that the code multiplexed scrambled record signal Srsa be formalized by a predetermined format for recording onto the optical disk DK. The recording device 6 is constructed to record the code multiplexed scrambled record signal Srsa in the predetermined format onto the optical disk DK.

The inverse-scramble function generator 7 is constructed to generate an inverse-scramble function as a decipherment function to convert the scrambled record signal Srs, which has been scrambled by the scramble function, to the original record signal Sr, on the basis of the scramble function signal Sf, and output an inverse-scramble function signal Srf indicating the generated inverse-scramble function. A transmitting device 8 is constructed to generate a code multiplexed inverse-scramble function signal Sif by multiplexing the disk identification code signal Si with respect to the inverse-scramble function signal Srf, and transmit it to an IC card issuing apparatus described later via a communication line such as a telephone line.

Nextly, the operation of the above described information recording apparatus S1 will be explained.

In FIG. 1, the record signal Sr outputted from the video and audio signal source 1 is inputted to the scrambler 4, and is scrambled on the basis of the scramble function indicated by the scramble function signal Sf, which is outputted from the scramble function generator 3. At this time, since the scramble function is generated differently depending on the code content of the disk identification code (i.e. the type of optical disk) on the basis of the disk identification code signal Si, the record signal Sr is scrambled by the different scrambled function for each disk identification code. Then, the scrambled record signal Srs is formatted by the formatter 5 together with the disk identification code corresponding to the scramble function at the time of scrambling. Then, it is finally recorded onto the optical disk DK as the code multiplexed scrambled record signal Srsa by the recording device 6.

Along with the above described operation, the scramble function signal Sf is inputted to the inverse-scramble function generator 7. Then, the inverse-scramble function is generated to recover the original record signal Sr by deciphering (decoding) the scrambled record signal Srs, on the basis of the scramble function used for scrambling the record signal Sr, so that the corresponding inverse-scramble function signal Srf is outputted. Then, by the transmitting device 8, the inverse-scramble function and the disk identification code are multiplexed to be outputted as the code multiplexed inverse-scramble function signal Sif, and are transmitted to the IC card issuing apparatus via the predetermined communication line such as the telephone line.

On the other hand, the optical disk DK to which the code multiplexed scrambled record signal Srsa has been recorded is replicated by a large number by a replicating apparatus, which is not shown in the figure, and is transported to the rental department where the IC card issuing apparatus is installed.

Actually, various types of optical disks corresponding to various types of record information can be produced, and various types of code multiplexed inverse-scramble function signal Sif corresponding to various types of record information are transmitted to the IC card issuing apparatus in the above described manner.

Further, although the scramble function is directly applied to the record signal Sr in the above explanation, the record signal Sr may be scrambled by a predetermined software program corresponding to the scramble function instead.

In the above explained information recording apparatus S1, although the scramble function is generated on the basis of the disk identification code, different scramble functions may be generated by the scramble function generator 3 each time when various types of record signal Sr are generated, and at the same timing, different disk identification codes may be generated by the disk identification code generator 2, so that the scramble function and the disk identification code corresponding to the record signal Sr may be transmitted to the IC card issuing apparatus.

Furthermore, in the above explained information recording apparatus S1, the disk identification code is generated by the disk identification code generator 2, and the scramble function and the inverse-scramble function are generated on the basis of the generated disk identification code. Instead, the TOC (Table Of Content) data, which are peculiar to each type of record signal Sr may be utilized as the disk identification code to identify the optical disk DK, to which the record signal Sr is recorded, the scramble function and the inverse-scramble function may be generated on the basis of this TOC data, and that the generated scramble function and the TOC data may be recorded onto the optical disk DK by the recording device 6, so that the TOC data and the inverse-scramble function be transmitted to the IC card issuing apparatus by the transmitting apparatus 8. In this case, the disk identification code generator 2 can be omitted.

(I-2) Function Recording Apparatus in the First Embodiment

Figure 2:
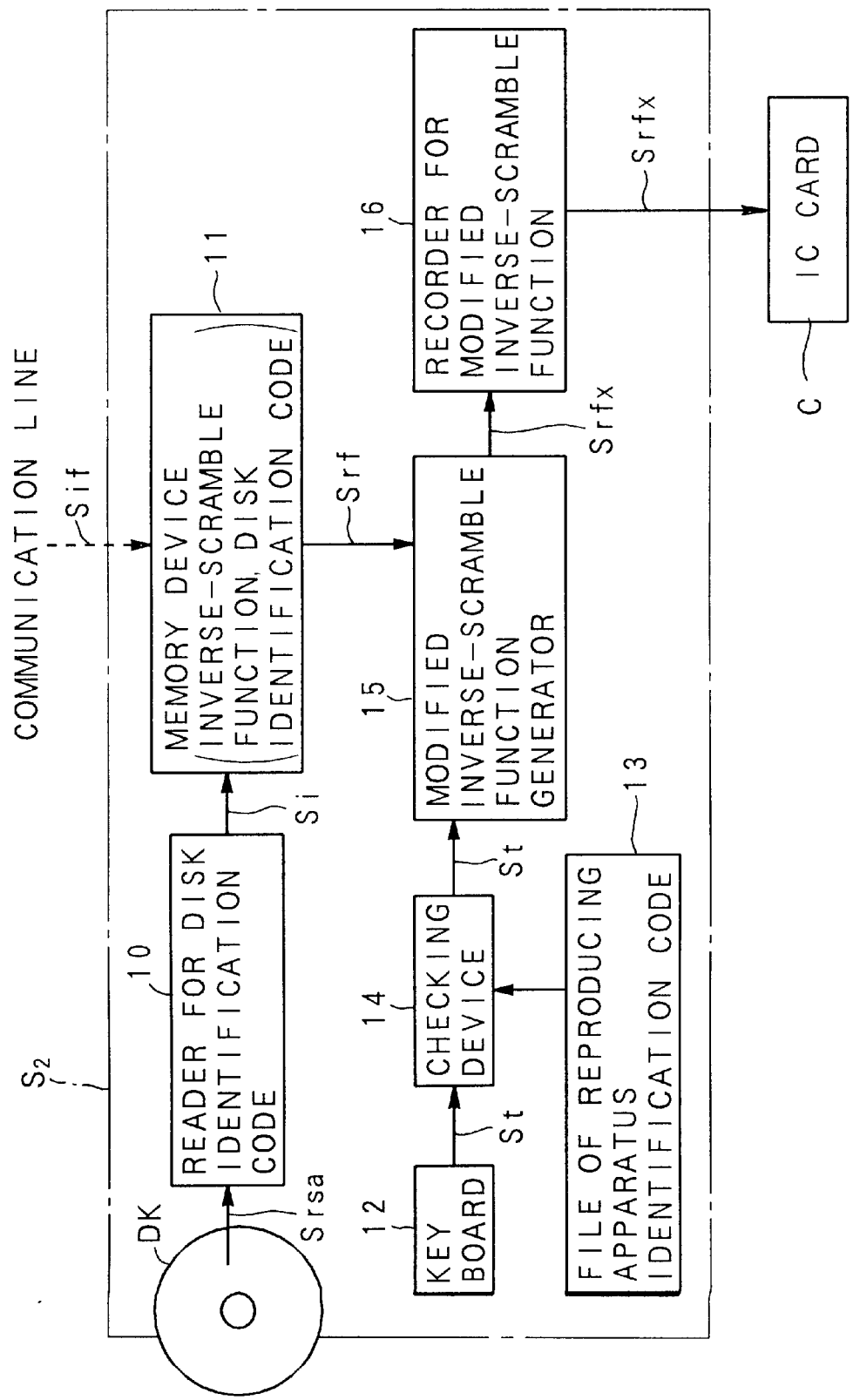
FIG. 2 is a block diagram of a function recording apparatus in the first embodiment.

FIG. 2 shows an IC (Integrated Circuit) card issuing apparatus as a function recording apparatus in the first embodiment. This IC card issuing apparatus is practically installed to a rental department (e.g. rental shop) for renting the optical disk to a consumer in the distribution process of the optical disk.

In FIG. 2, an IC card issuing apparatus S2 for issuing an IC card C in the present embodiment is provided with a reader 10 for the disk identification code, a memory device 11 for storing the inverse-scramble function and the disk identification code, a key board 12, a file 13 of the reproducing apparatus identification code, a checking device 14, a modified inverse-scramble function generator 15, and a recorder 16 for the modified inverse-scramble function.

The reader 10 for the disk identification code is constructed to read the code multiplexed scrambled record signal Srsa from the optical disk DK, on which the signal Srsa has been recorded by the aforementioned information recording apparatus S1, extract the disk identification code out of the read signal, and output the disk identification code signal Si corresponding to the extracted code.

The memory device 11 is constructed to extract various kinds of inverse-scramble functions out of the code multiplexed inverse-scramble function signal Sif, which is transmitted from the aforementioned information recording apparatus S1 via the communication line (namely, various kinds of code multiplexed inverse-scramble function signals Sif corresponding to various kinds of record information are transmitted to the memory device 11), temporarily store the extracted signals together with the corresponding disk identification codes respectively, and output the inverse-scramble function signal Srf indicating the inverse-scramble function corresponding to the disk identification code indicated by the disk identification code signal Si inputted from the reader 10.

The key board 12 is constructed such that the reproduction apparatus identification code set in advance for the consumer, to whom the optical disk DK is rented, can be inputted by the key board 12 by the consumer or the clerk of the rental shop. The checking device 14 is constructed to check the identity of the inputted reproducing apparatus identification code with respect to the record content of the file 13 of the reproducing apparatus identification code, which has stored various kinds of reproducing apparatus identification codes in advance, and output the reproducing apparatus identification code signal St only in the case that the reproducing apparatus identification code signal St, which corresponds to the reproducing apparatus identification code recorded (registered) in the file 13 in advance, is inputted thereto from the key board 12.

The modified inverse-scramble function generator 15 generates a modified inverse-scramble function, which is obtained by modifying the inverse-scramble function by the reproducing apparatus identification code on the basis of the inverse-scramble function signal Srf and the reproducing apparatus identification code signal St, and output the modified inverse-scramble function signal Srfx indicating the generated function. The recorder 16 for the modified inverse-scramble function is constructed to record the modified inverse-scramble function signal Srfx to the IC card C.

Next, the operation of the IC card issuing apparatus S2 will be explained with referring to FIG. 2.

In FIG. 2, when the various types of code multiplexed inverse-scramble function signals Sif are transmitted from the information recording apparatus S1 via the communication line, they are stored into the memory device 11, such that each signal Sif is stored together with one of the disk identification codes corresponding to its inverse-scramble function respectively. On the other hand, the code multiplexed scrambled record signal Srsa is read out by the reader 10 for the disk identification code from the optical disk DK which has been transported from the production department. The read out disk identification code is inputted to the memory device 11, and is checked (compared) with the disk identification codes, which are stored in the memory device 11 in advance. Then, if there is stored the disk identification code in the memory device 11, which is identical with the just inputted disk identification code from the reader 10, the inverse-scramble function signal Srf indicating the inverse-scramble function corresponding to this identical disk identification code is outputted to the modified inverse-scramble function generator 15.

Along with this, when the reproducing apparatus identification code, which has been set in advance, is inputted via by the key board 12 by the consumer or the clerk of the rental shop, the checking device 14 checks (compares) the inputted reproducing apparatus identification code with the file 13 of the reproducing apparatus identification code where a plurality of the reproducing apparatus identification codes are registered in advance. Then, only in case that the reproducing apparatus identification code identical with one of the registered codes is inputted thereto from the key board 12, the reproducing apparatus identification code signal St indicating this identical reproducing apparatus identification code is outputted to the modified inverse-scramble function generator 15. Then, the modified inverse-scramble function generator 15 generates the modified inverse-scramble function on the basis of the inverse-scramble function signal Srf and the reproducing apparatus identification code signal St, to output the corresponding modified inverse-scramble function signal Srfx. Then, the recorder 16 for the modified inverse-scramble function records the modified inverse-scramble function signal Srfx to the IC card C. At this time, the modified inverse-scramble function signal Srfx may be recorded to the IC card C as it is, or may be recorded to the IC card C after encoding or converting it by random number.

After this, the consumer brings the optical disk DK, on which the code multiplexed scrambled record signal Srsa is recorded, and the IC card C, to which the modified inverse-scramble function signal Srfx is recorded, back to the place (e.g. home) where the information reproducing apparatus described later is installed.

As explained in the section for the information recording apparatus S1, in case that the TOC data corresponding to the record signal Sr are used as the disk identification code, the memory device 11 stores the TOC data, which are transmitted together with the inverse-scramble function, the reader 10 for the disk identification code reads the TOC data from the optical disk DK as well, and the memory device 11 checks the read-out TOC data and the TOC data stored in the memory device 11, so as to output the inverse-scramble function corresponding to the TOC data checked to be identical with the stored TOC data.

(I-3) Information Reproducing Apparatus in the First Embodiment

Figure 3:
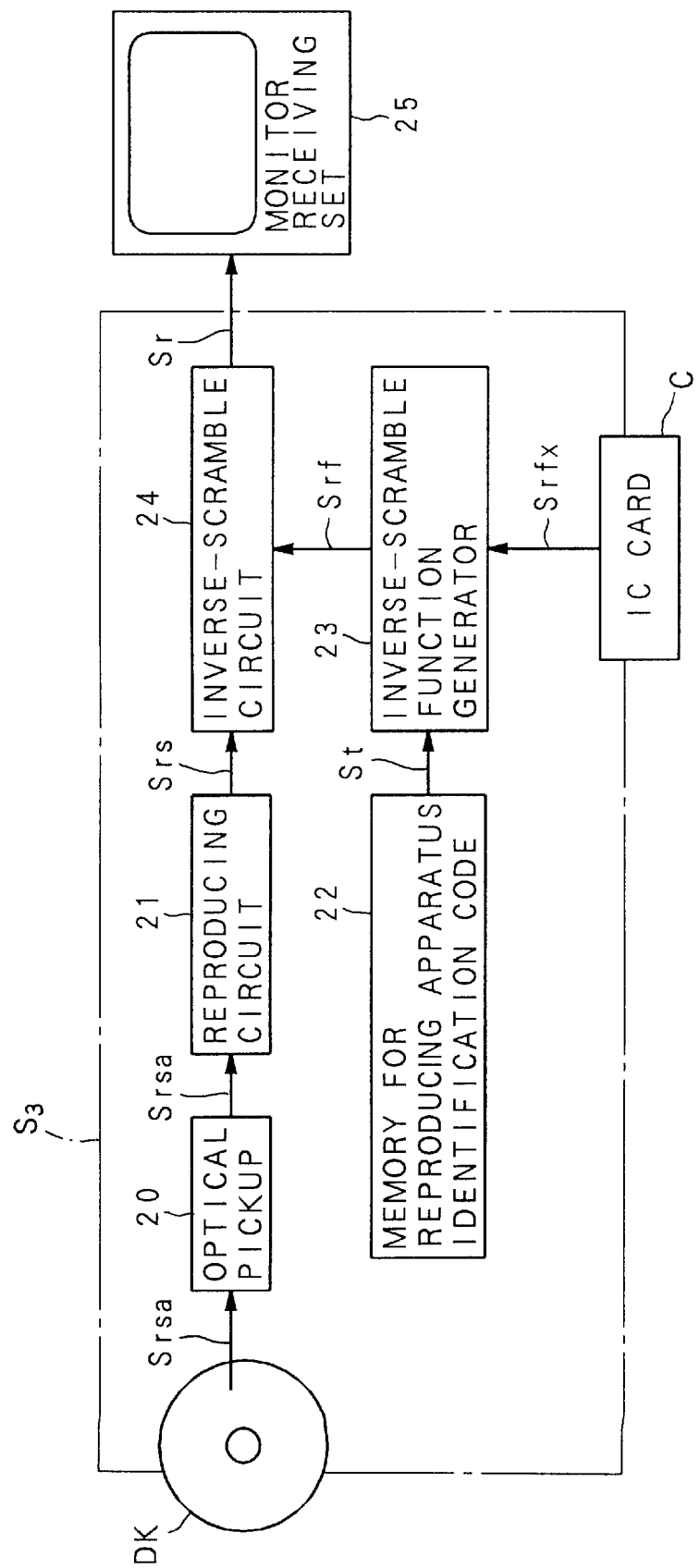
FIG. 3 is a block diagram of an information reproducing apparatus in the first embodiment.

FIG. 3 shows an information reproducing apparatus in the first embodiment. This information reproducing apparatus is owned by the consumer in the distribution process of the optical disk.

In FIG. 3, an information reproducing apparatus S3 is provided with an optical pickup 20, a reproducing circuit 21, a memory 22 for the reproducing apparatus identification code, an inverse-scramble function generator 23, and an inverse-scramble circuit 24.

The optical pickup 20 is constructed to detect the code multiplexed scrambled record signal Srsa from the optical disk DK, which is brought back by the consumer and on which the code multiplexed scrambled record signal Srsa is recorded. The reproducing circuit 21 is constructed to reproduce the code multiplexed scrambled record signal Srsa detected by the optical pickup 20, and extract and output the scrambled record signal Srs out of the code multiplexed scrambled record signal Srsa. The memory 22 stores the reproducing apparatus identification code, which has been inputted and set in advance. The inverse-scramble function generator 23 is constructed to read out the modified inverse-scramble function signal Srfx from the IC card C, which has been brought back by the consumer together with the optical disk DK, generate the inverse-scramble function on the basis of the modified inverse-scramble function indicated by the modified inverse-scramble function signal Srfx read out from the IC card C, and the reproducing apparatus identification code, which is stored in the memory 22, and finally output the inverse-scramble function signal Srf. The inverse-scramble circuit 24 is constructed to decipher the inputted scrambled record signal Srs and output the record signal Sr on the basis of the inverse-scramble function signal Srf supplied from the inverse-scramble function generator 23.

Next, the operation of the information reproducing apparatus S3 will be explained with referring to FIG. 3.

In FIG. 3, the code multiplexed scrambled record signal Srsa recorded on the optical disk DK which has been brought back by the consumer, is detected by the optical pickup 20. Then, out of the detected signal, the scrambled record signal Srs is extracted by the reproducing circuit 21 and is inputted to the inverse-scramble circuit 24.

Along with this, the reproducing apparatus identification code, which has been set and stored in advance to the memory 22, is read out from the memory 22, and is inputted to the inverse-scramble function generator 23 as the reproducing apparatus identification code signal St. Here, the reproducing apparatus identification code stored in the memory 22 is a code same as that inputted from the key board 12 at the IC card issuing apparatus S2 when the optical disk DK is rented to the consumer. Further, the memory 22 is a memory to store the reproducing apparatus identification code peculiar to the information reproducing apparatus S3 when the consumer purchases the information reproducing apparatus S3, and comprises a non-volatile memory of non-rewritable type so that the reproducing apparatus identification code cannot be rewritten (i.e. the new reproducing apparatus identification code cannot be inputted) once the reproducing apparatus identification code is stored and set in the memory 22.

Then the reproducing apparatus identification code signal St is inputted from the memory 22 in the above mentioned manner, and when the modified inverse-scramble function signal Srfx is inputted from the IC card C, the inverse-scramble function generator 23 generates the inverse-scramble function to decipher the scrambled record signal Srs, and outputs the corresponding inverse-scramble function signal Srf to the inverse-scramble circuit 24. At this time, the inverse-scramble function generated by the inverse-scramble function generator 23 is a function same as that generated by the aforementioned inverse-scramble function generator 7 of the information recording apparatus S1.

After that, the inverse-scramble circuit 24 deciphers the scrambled record signal Srs by use of the inverse-scramble function indicated by the inverse-scramble function signal Srf, to output the original record signal Sr. Then, the video and audio corresponding to the video and audio signals included in the outputted record signal Sr respectively are displayed and sound-outputted respectively by a monitor receiving set 25.

By the above described operation, the record signal Sr recorded on the optical disk DK can be normally reproduced.

As described above, according to the information recording apparatus S1, the IC card issuing apparatus S2 and the information reproducing apparatus S3 constituting the first embodiment of the present invention, the modified inverse-scramble function, which is generated on the basis of the inverse-scramble function and the reproducing apparatus identification code, is recorded to the IC card IC, and this IC card is rented to the consumer together with the optical disk DK, on which the scrambled record signal Srs is recorded, so that the inverse-scramble function can be generated from the modified inverse-scramble function read out from the IC card C only by the information reproducing apparatus S3, which is owned by the consumer and to which the reproducing apparatus identification code is stored. By this, the record signal Sr can be outputted by deciphering the scrambled record signal Srs. Accordingly, the record signal Sr can be reproduced only by the information reproducing apparatus S3, which has a certain reproducing apparatus identification code. Thus, identifying and specifying the information reproducing apparatus can be performed efficiently and perfectly.

In the above described construction of the information reproducing apparatus S3, the memory 22 comprises the non-volatile memory of non-rewritable type, so that the additional registration of the reproducing apparatus identification code cannot be performed by the consumer etc. Instead, the memory 22 may comprise a non-volatile memory of rewritable type, so that the additional registration of the reproducing apparatus identification code by an appropriate number of times to identify the information reproducing apparatus can be performed. In this case, the system is constructed such that the reproducing apparatus identification code, which has been stored once in the past can be maintained, and that an identification code identical with this maintained identification code cannot be re-written. By this, the optical disk DK which has been once registered by the reproducing apparatus identification code in the past cannot be reproduced, so that the disadvantage from which the consumer suffers is large, resulting in the improvement of preventing the illegal copy of the optical disk DK by the consumer.

Further, the IC card C may have the timer function, and it may be prohibited to read out the modified inverse-scramble function by the information reproducing apparatus S3 after it has elapsed a predetermined time period since the modified inverse-scramble function is stored by the IC card issuing apparatus S2. In this case, since it is prohibited to reproduce the optical disk DK after the time limit of returning the rented optical disk DK, resulting in the improvement of preventing the illegal copy by the consumer.

Furthermore, in order to prevent the consumer from performing an illegal modification of the information reproducing apparatus S3, the memory 22 and the inverse-scramble function generator 23 may comprise one LSI (Large Scale Integrated) circuit which is in one body and cannot be separated. Alternatively, for the same purpose, the inverse-scramble function generator 23 may be integrated in the IC card C.

(II) Second Embodiment

A second embodiment of the present invention will be explained with referring to FIGS. 4 and 5. In the second embodiment, the present invention is applied to identify a reproducing apparatus for reproducing a rental optical disk, on which video and audio information is recorded and which is rented to a consumer in the rental business in the same manner as the first embodiment. In the second embodiment, the modified inverse-scramble function is not recorded to the IC card C, but is recorded to a rewritable record portion of the optical disk DK such as a magnetic record band.

In the explanation below, the constitutional elements same as those in the first embodiment carry the same reference numerals and the detailed explanations thereof are omitted.

(II-1) Information Recording Apparatus in the Second Embodiment

The optical disk DK' has a magnetic rewritable record band at a region, which is located at an inner or outer circumference side of the record area where the code multiplexed scrambled record signal Srsa is recorded, and which is coaxial with the record area. Other than this construction of the optical disk DK', the information recording apparatus of the second embodiment is the same as that of the first embodiment. Thus, the explanation as for the construction and the operation of the information recording apparatus of the second embodiment is omitted.

(II-2) Function Recording Apparatus in the Second Embodiment

A disk registering apparatus as a function recording apparatus in the second embodiment will be explained with referring to FIG. 4. This disk registering apparatus is practically installed to the rental department (i.e. the rental shop) which rents the optical disk DK' to the consumer. The optical disk DK' has a magnetic rewritable record band T at a region, which is located at an inner circumference side of the record area where the code multiplexed scrambled record signal Srsa is recorded, and which is coaxial with the record area, as compared with the optical disk DK.

Figure 4:
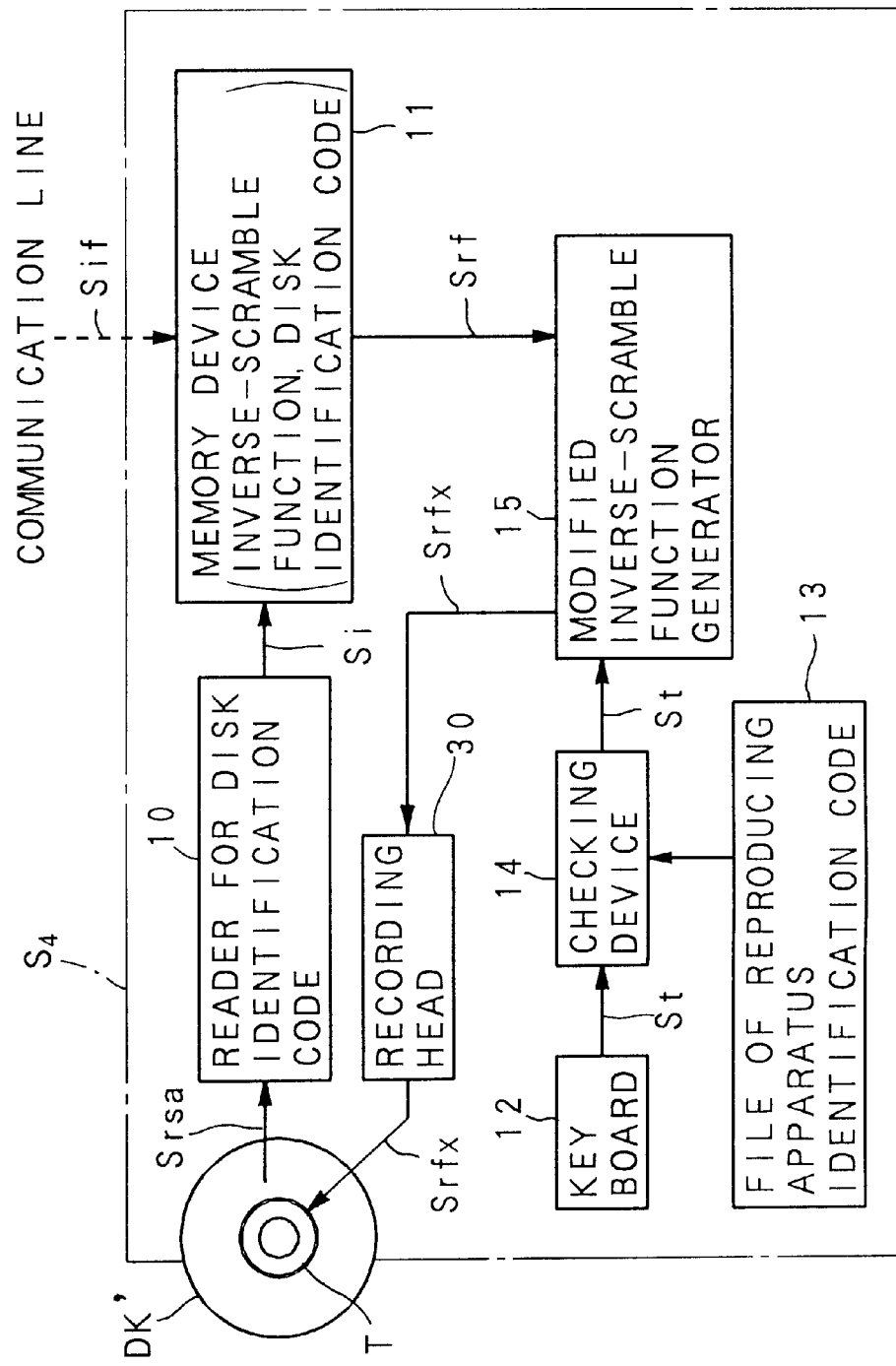
FIG. 4 is a block diagram of a function recording apparatus in a second embodiment of the present invention.

In FIG. 4, a disk registering apparatus S4 is provided with a magnetic recording head 30 for recording the modified inverse-scramble function signal Srfx indicating the modified inverse-scramble function, which is generated by the modified inverse-scramble function generator 15, onto the magnetic rewritable record band T of the optical disk DK', in place of the recorder 16 for recording the modified inverse-scramble function to the IC card C in the first embodiment of FIG. 2. Other than this construction of the magnetic recording head 30, the constructions of the disk registering apparatus S4 are the same as those of the IC card issuing apparatus S2, and the detailed explanations thereof are omitted.

Next, the operation of the disk registering apparatus S4 will be explained with referring to FIG. 4.

In FIG. 4, the modified inverse-scramble function signal Srfx, which indicates the modified inverse-scramble function generated by the modified inverse-scramble function generator 15, is magnetically recorded to the magnetic recording band T of the optical disk DK'. Other than this operation of the magnetic recording head 30, the operations of the disk registering apparatus S4 are the same as those of the IC card issuing apparatus S2 in FIG. 2, and the detailed explanations thereof are omitted.

The consumer brings the optical disk DK', on which the code multiplexed scrambled record signal Srsa and the modified inverse-scramble function signal Srfx are recorded back to the place (e.g. home) where the information reproducing apparatus explained below is installed.

(II-3) Information Reproducing Apparatus in the Second Embodiment

An information reproducing apparatus of the second embodiment will be explained with referring to FIG. 5. This information reproducing apparatus is practically owned by the consumer in the same manner as the information reproducing apparatus S3 of the first embodiment in FIG. 3.

Figure 5:
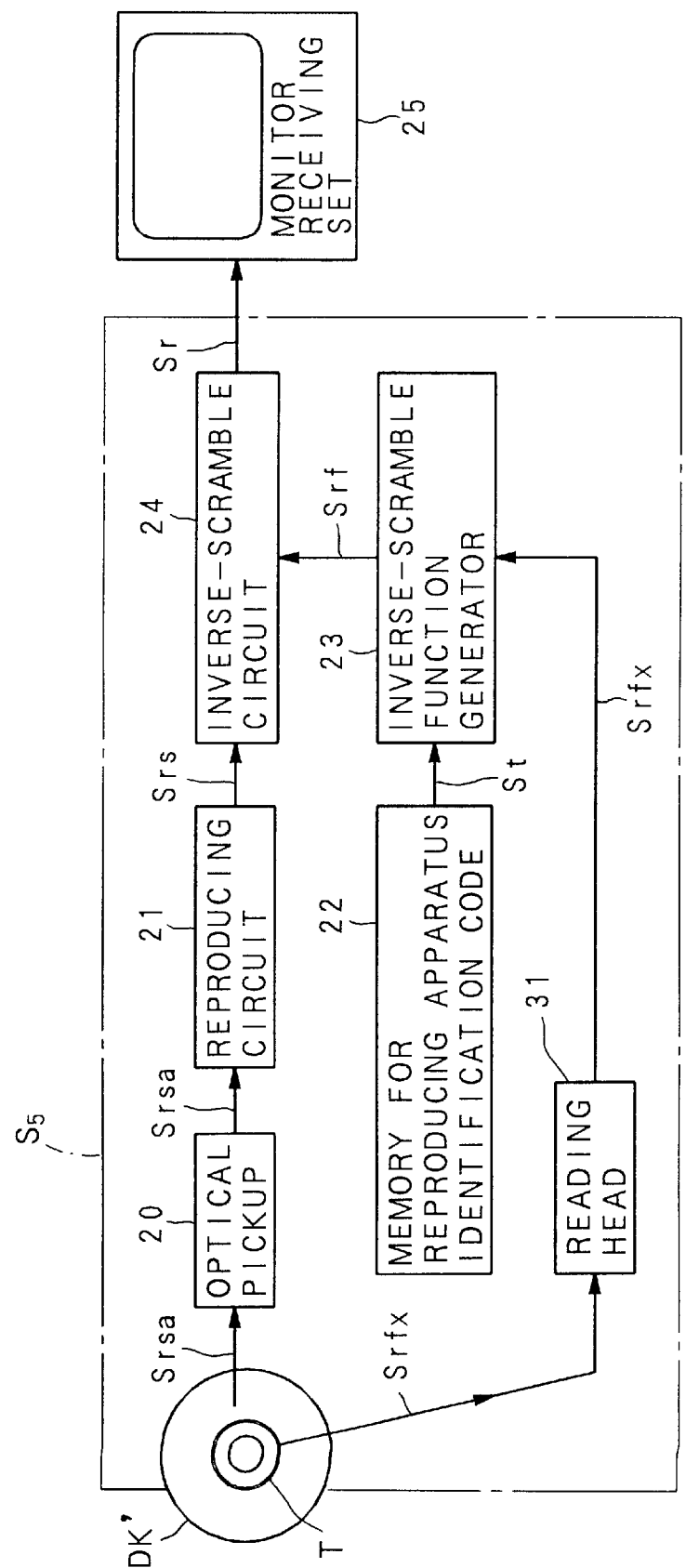
FIG. 5 is a block diagram of an information reproducing apparatus in the second embodiment.

In FIG. 5, an information reproducing apparatus S5 is provided with a magnetic reading head 31 for reading the modified inverse-scramble function signal Srfx recorded on the magnetic record band T of the optical disk DK', which is brought back by the consumer, in place of the IC card C for the information reproducing apparatus S3 in the first embodiment of FIG. 3. Other than this construction of the magnetic reading head 31, the constructions of the information reproducing apparatus S5 are the same as those of the information reproducing apparatus S3, and the detailed explanations thereof are omitted.

Next, the operation of the information reproducing apparatus S5 will be explained with referring to FIG. 5.

In FIG. 5, the modified inverse-scramble function signal Srfx, which is recorded on the magnetic record band T of the optical disk DK', is read by the magnetic reading head 31. Then, the inverse-scramble function generator 23 generates the inverse-scramble function on the basis of the modified inverse-scramble function signal Srfx, which is read out by the magnetic reading head 31, and the reproducing apparatus identification code signal St, which is outputted from the memory 22, and outputs the inverse-scramble function signal Srf to the inverse-scramble circuit 24. Other than this operation of the magnetic reading head 31, the operations of the information reproducing apparatus S5 are the same as those of the information reproducing apparatus S3 in FIG. 3, and the detailed explanations thereof are omitted.

As described above, according to the information recording apparatus S1, the disk registering apparatus S4 and the information reproducing apparatus S5 constituting the second embodiment of the present invention, the modified inverse-scramble function signal Srfx is recorded on the magnetic record band T of the optical disk DK'. Therefore, while it is not necessary to use the IC card C, the record signal Sr can be reproduced only by the information reproducing apparatus S5, which has a certain reproducing apparatus identification code, in the same manner as the first embodiment. Thus, identifying and specifying the information reproducing apparatus can be performed efficiently and perfectly, and the simplicity and convenience of the system on the whole can be promoted.

As for the information recording apparatus S1, the disk registering apparatus S4 and the information reproducing apparatus 35 in the second embodiment can be modified in the manner indicated in the explanation for the information reproducing apparatus S1, the IC card issuing apparatus S2 and the information reproducing apparatus S3 in the first embodiment.

(III) Modified Embodiment of the Second Embodiment

A modified embodiment of the second embodiment will be explained with referring to FIG. 5A.

In the modified embodiment of the second embodiment, the present invention is applied to the optical disk DK" which is for sale in the normal selling business instead of the rental business.

In the modified embodiment of the second embodiment, the modified inverse-scramble function signal Srfx is recorded in the non-rewritable manner onto a portion of the optical disk.

Figure 5A:
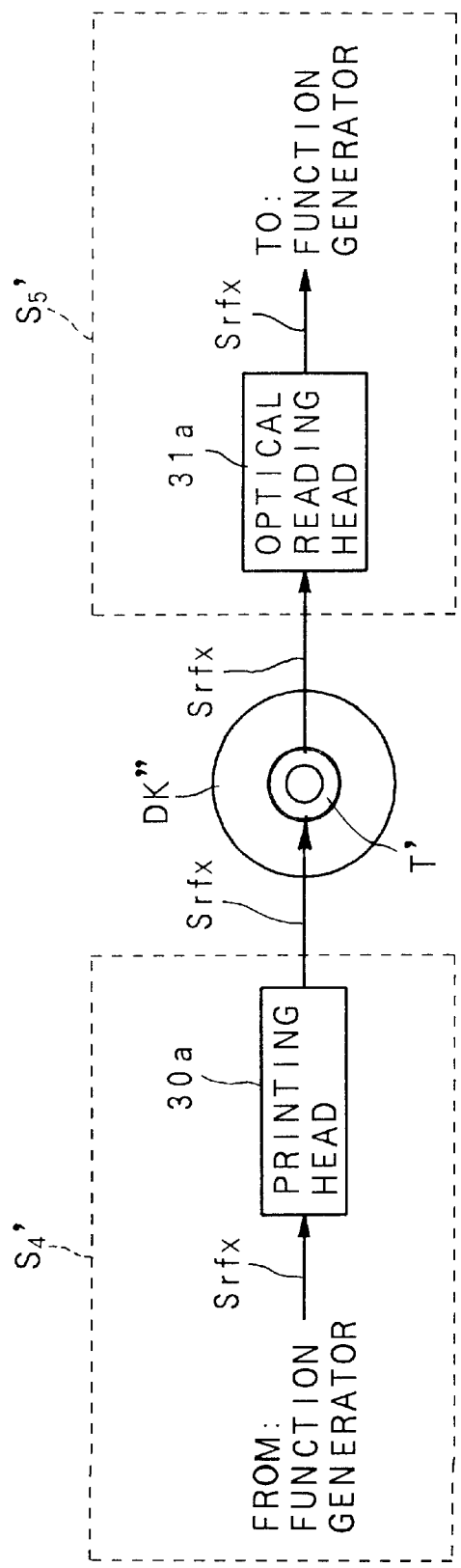
FIG. 5A is a block diagram of a function recording apparatus and an information reproducing apparatus in a modified second embodiment.

In FIG. 5A, in place of the magnetic recording head 30 in the disk registering apparatus S4 of the second embodiment, the printing head 30*a* for printing characters is utilized to print or imprint the modified inverse-scramble function to a rewritable record band T' of the optical disk DK". Then, as for the information reproducing apparatus S5, in place of the magnetic reading head 31, the optical reading head 31*a* for optically reading the printed or imprinted modified inverse-scramble function is utilized.

Other than these points, the constructions and the operations of this modified embodiment are the same as those of the second embodiment.

By constructing in the above mentioned manner, even in the case of the optical disk DK" for sale, the identification of the information reproducing apparatus can be efficiently and reliably performed in the same manner as in the second embodiment.

By utilizing the same recording format and the same recording position on the disk of the modified inverse-scramble function for both types of optical disks i.e. the rental type optical disk DK' and the selling type optical disk DK", and by constructing the rewritable record band T (in FIGS. 4 or 5) and the non-rewritable band portion of the disk from such a material that the same head can read the modified scramble function from both types of optical disks (e.g. the phase changeable recording material), both types of optical disks can be reproduced by the same reproducing apparatus.

(IV) Third Embodiment

A third embodiment will be explained with referring to FIG. 6. In the third embodiment, the optical disk DK of the first embodiment is applied to the CD-ROM (Compact Disk—Read Only Memory) which is a record medium for a computer.

In the third embodiment, the information recording apparatus and the IC card issuing apparatus are the same as those in the first embodiment, and the detailed explanations thereof are omitted. In the present embodiment however, the digital data signal for a computer is scrambled and recorded in place of the record signal including the video and audio data signal, as the record signal Sr.

Next, the information reproducing apparatus and the computer in the third embodiment will be explained. In the following explanations, the constitutional elements same as those in the first embodiment carry the same reference numerals and the detailed explanations thereof are omitted.

Figure 6:
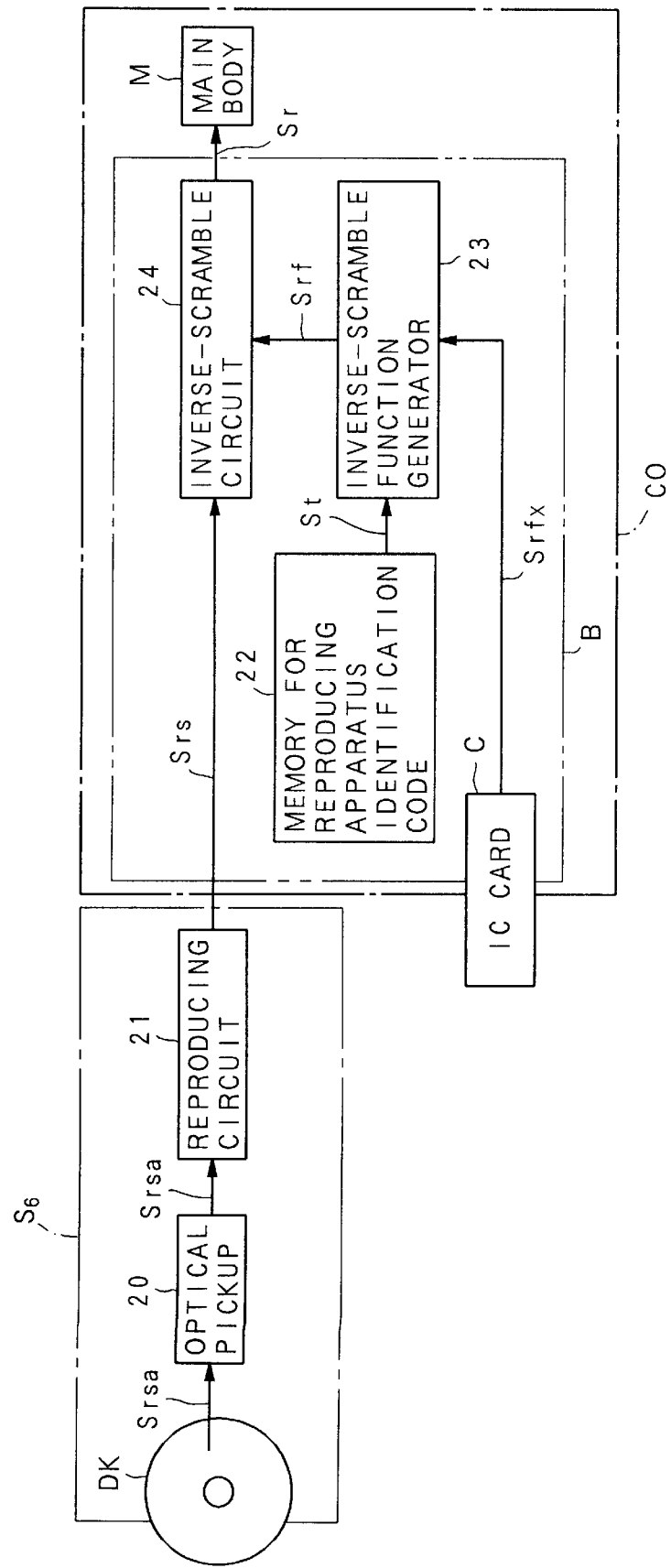
FIG. 6 is a block diagram of an information reproducing apparatus and a computer in a third embodiment of the present invention.

In FIG. 6, an information reproducing apparatus S6 is provided with: the optical pickup 20 for detecting the code multiplexed scrambled record signal Srsa, which is the digital data signal for a computer, from the optical disk DK; and the reproducing circuit 21 for extracting the scrambled record signal Srs out of the code multiplexed scrambled record signal Srsa detected by the optical pickup 20. A computer CO is provided with: the memory 22 for the reproducing apparatus identification code; the inverse-scramble function generator 23; and the inverse-scramble circuit 24. Those elements of the computer CO are all installed on an inverse-scramble board B, which is inserted into the extending slot of the computer CO. The modified inverse-scramble function signal Srfx from the IC card C is inputted by a predetermined way, and the deciphering and reproducing operations for the scrambled record signal Srs are performed by those elements on the inverse-scramble board B. The computer CO is further provided with a computer main body, which includes a CPU, a memory and so on. The reproduced record signal Sr is outputted to the computer main body M. The constructions and the operations of the elements on the inverse-scramble board B are the same as those in the first embodiment, and the detailed explanations thereof are omitted.

In the third embodiment, since only the scrambled record signal Sr is outputted from the information reproducing apparatus S6, the optical disk DK can be hardly copied illegally. Further, the reproduced record signal Sr is transmitted and received only within the computer CO, it is very difficult to steal and use the digital data signal of the optical disk DK.

As described above in detail, according to the third embodiment, even in case of applying the optical disk DK to the CD-ROM for the computer, the effect and advantage same as those in the first embodiment can be obtained.

In the third embodiment, it is possible to use the flexible disk (FD) as the record medium for recording the modified inverse-scramble function signal Srfx in place of the IC card C. In this case, the modified inverse-scramble function signal Srfx is read by the FD drive device of the computer CO, and is outputted directly to the inverse-scramble function generator 23 on the inverse-scramble board B.

(V) Fourth Embodiment

A fourth embodiment will be explained with referring to FIG. 7. In the fourth embodiment, the optical disk DK' of the second embodiment is applied to the CD-ROM which is a record medium for a computer.

In the fourth embodiment, the information recording apparatus and the disk registering apparatus are the same as those in the second embodiment, and the detailed explanations thereof are omitted. In the present embodiment however, the digital data signal for a computer is scrambled and recorded in place of the record signal including the video and audio data signal, as the record signal Sr, in the same manner as the third embodiment.

Next, the information reproducing apparatus and the computer in the fourth embodiment will be explained. In the following explanations, the constitutional elements same as those in the second embodiment carry the same reference numerals and the detailed explanations thereof are omitted.

In FIG. 7, an information reproducing apparatus S7 is provided with: the optical pickup 20 for detecting the code multiplexed scrambled record signal Srsa, which is the digital data signal for a computer, from the optical disk DK'; the reproducing circuit 21 for extracting the scrambled record signal Srs out of the code multiplexed scrambled record signal Srsa detected by the optical pickup 20; and the reading head 31 for reading the modified inverse-scrambled function signal Srfx recorded on the magnetic record band T of the optical disk DK'. The computer CO is provided with: the memory 22 for the reproducing apparatus identification code; the inverse-scramble function generator 23; and the inverse-scramble circuit 24. Those elements of the computer CO are all installed on an inverse-scramble board B, which is inserted into the extending slot of the computer CO. The modified inverse-scramble function signal Srfx from the reading head 31 is inputted by a predetermined way, and the deciphering and reproducing operations for the scrambled record signal Srs are performed by those elements on the inverse-scramble board B. The computer CO is further provided with the computer main body, which includes a CPU, a memory and so on. The reproduced record signal Sr is outputted to the computer main body M. The constructions and the operations of the elements on the inverse-scramble board B are the same as those in the second embodiment, and the detailed explanations thereof are omitted.

In the fourth embodiment, since only the scrambled record signal Sr and the modified inverse-scrambled function signal Srfx are outputted from the information reproducing apparatus S7, the optical disk DK can be hardly copied illegally. Further, the reproduced record signal Sr is transmitted and received only within the computer CO, it is very difficult to steal and use the digital data signal of the optical disk DK.

As described above in detail, according to the fourth embodiment, even in case of applying the optical disk DK' to the CD-ROM for the computer, the effect and advantage same as those in the second embodiment can be obtained.

In each of the above described embodiments, if one consumer owns a plurality of information reproducing apparatuses, by unifying the reproducing apparatus identification codes of all of those information reproducing apparatuses owned by the consumer to be the same code, the reproducing apparatus identification code can be utilized as the consumer identification code.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. A system for limiting reproduction of record information recorded on a first record medium, said system comprising:

(a) an information recording apparatus comprising:
a scramble function generating device for generating a scramble function by using a record medium identification code, the record medium identification code being used for identifying the first record medium;
a scrambling device for scrambling a record signal corresponding to the record information by using the generated scramble function; and
a record signal recording device for recording the scrambled record signal and the record medium identification code onto the first record medium, (b) a function recording apparatus comprising:
a decode function storage device for storing a plurality of sets of the record medium identification code and a decode function;
an identification code reading device for reading the record medium identification code from the first record medium;
an identifying device for identifying the decode function corresponding to the record medium identification code read from the first record medium by comparing the record medium identification code read from the first record medium with the record medium identification code stored in the decode function storage device;
an inputting device for inputting a reproducing apparatus identification code, the reproducing apparatus identification code being used for identifying a reproducing apparatus;
a modifying device for modifying the identified decode function by using the input reproducing apparatus identification code; and
a decode function recording device for recording the modified decode function onto a second record medium, and (c) the reproducing apparatus comprising:
an identification code storage device for storing the reproducing apparatus identification code;
a modified decode function reading device for reading the modified decode function from the second record medium;
a restoring device for restoring the decode function by using the modified decode function read from the second record medium and the reproducing apparatus identification code stored in the identification code storage device;
a record signal reading device for reading the scrambled record signal from the first record medium;

a decoding device for decoding the read scrambled record signal by using the restored decode function; and a reproducing device for reproducing the decoded record signals.

2. A system according to claim 1, wherein the information recording apparatus further comprises:

a decode function generating device for generating the decode function on the basis of the scramble function; and a sending device for sending a set of the record medium identification code and the decode function to the function recording apparatus.

3. A system according to claim 2, wherein the function recording apparatus further comprises:

a receiving device for receiving the set of the record medium identification code and the decode function from the information recording apparatus; and an adding device for adding the received set of the record medium identification code and the decode function to the storage device.

4. A system according to claim 1, wherein the second record medium is an IC card.

5. A system for limiting reproduction of record information recorded on a record medium, said system comprising:

(a) an information recording apparatus comprising:

a scramble function generating device for generating a scramble function by using a record medium identification code, the record medium identification code being used for identifying the record medium;

a scrambling device for scrambling a record signal corresponding to the record information by using the generated scramble function; and a record signal recording device for recording the scrambled record signal and the record medium identification code onto the record medium, (b) a function recording apparatus comprising:

a decode function storage device for storing a plurality of sets of the record medium identification code and a decode function;

an identification code reading device for reading the record medium identification code from the record medium;

an identifying device for identifying the decode function corresponding to the record medium identification code read from the record medium by comparing the record medium identification code road from the record medium with the record medium identification code stored in the decode function storage device;

an inputting device for inputting a reproducing apparatus identification code, the reproducing apparatus identification code being used for identifying a reproducing apparatus;

a modifying device for modifying the identified decode function by using the input reproducing apparatus identification code; and a decode function recording device for recording the modified decode function onto the record medium, and (c) the reproducing apparatus comprising:

an identification code storage device for storing the reproducing apparatus identification code;

a modified decode function reading device for reading the modified decode function from the record medium;

a restoring device for restoring the decode function by using the modified decode function read from the record medium and the reproducing apparatus identification code stored in the identification code storage device;

a record signal reading device for reading the scrambled record signal from the record medium;

a decoding device for decoding the read scrambled record signal by using the restored decode function; and a reproducing device for reproducing the decoded record signals.

6. A system according to claim 5, wherein the information recording apparatus further comprises:

a decode function generating device for generating the decode function on the basis of the scramble function; and a sending device for sending a set of the record medium identification code and the decode function to the function recording apparatus.

7. A system according to claim 6, wherein the function recording apparatus further comprises:

a receiving device for receiving the set of the record medium identification code and the decode function from the information recording apparatus; and an adding device for adding the received set of the record medium identification code and the decode function to the storage device.

8. A function recording apparatus for generating a modified decode function to be used for decoding a scrambled record signal recorded on a first record medium, and recording the modified decode function onto a second record medium, the first record medium having a record medium identification code to identify the first record medium itself, the function recording apparatus comprising:

a decode function storage device for storing a plurality of sets of the record medium identification code and a decode function;

an identification code reading device for reading the record medium identification code from the first record medium;

an identifying device for identifying the decode function corresponding to the record medium identification code read from the first record medium by comparing the record medium identification code read from the first record medium with the record medium identification code stored in the decode function storage device;

an inputting device for inputting a reproducing apparatus identification code, the reproducing apparatus identification code being used for identifying a reproducing apparatus;

a modifying device for modifying the identified decode function by using the input reproducing apparatus identification code; and a decode function recording device for recording the modified decode function onto the second record medium.

9. A function recording apparatus according to claim 8 further comprising:

a receiving device for receiving the set of the record medium identification code and the decode function from an external apparatus; and an adding device for adding the received set of the record medium identification code and the decode function to the storage device.

10. A function recording apparatus according to claim 8, wherein the second record medium is an IC card.

11. A function recording apparatus for generating a modified decode function to be used for decoding a scrambled record signal recorded on a record medium, and recording the modified decode function onto the record medium, the record medium having a record medium identification code to identify the record medium itself, the function recording apparatus comprising:

a decode function storage device for storing a plurality of sets of the record medium identification code and a decode function;

an identification code reading device for reading the record medium identification code from the record medium;

an identifying device for identifying the decode function corresponding to the record medium identification code read from the record medium by comparing the record medium identification code read from the record medium with the record medium identification code stored in the decode function storage device;

an inputting device for inputting a reproducing apparatus identification code, the reproducing apparatus identification code being used for identifying a reproducing apparatus;

a modifying device for modifying the identified decode function by using the input reproducing apparatus identification code; and a decode function recording device for recording the modified decode function onto the record medium.

12. A function recording apparatus according to claim 11 further comprising:

a receiving device for receiving the set of the record medium identification code and the decode function from an external apparatus; and an adding device for adding the received set of the record medium identification code and the decode function to the storage device.

13. A function recording method of generating a modified decode function to be used for decoding a scrambled record signal recorded on a first record medium, and recording the modified decode function onto a second record medium, the first record medium having a record medium identification code to identify the first record medium itself, the function recording method comprising the processes of:

storing a plurality of sets of the record medium identification code and a decode function into a decode function storage device;

reading the record medium identification code from the first record medium;

identifying the decode function corresponding to the record medium identification code read from the first record medium by comparing the record medium identification code read from the first record medium with the record medium identification code stored in the decode function storage device;

inputting a reproducing apparatus identification code, the reproducing apparatus identification code being used for identifying a reproducing apparatus;

modifying the identified decode function by using the input reproducing apparatus identification code; and recording the modified decode function onto the second record medium.

14. A function recording method according to claim 13 further comprising the processes of:

receiving the set of the record medium identification code and the decode function from an external apparatus; and adding the received set of the record medium identification code and the decode function to the storage device.

15. A function recording method of generating a modified decode function to be used for decoding a scrambled record signal recorded on a record medium, and recording the modified decode function onto the record medium, the record medium having a record medium identification code to identify the record medium itself, the function recording method comprising the processes of:

storing a plurality of sets of the record medium identification code and a decode function into a decode function storage device;

reading the record medium identification code from the record medium;

identifying the decode function corresponding to the record medium identification code read from the record medium by comparing the record medium identification code read from the record medium with the record medium identification code stored in the decode function storage device;

inputting a reproducing apparatus identification code, the reproducing apparatus identification code being used for identifying a reproducing apparatus;

modifying the identified decode function by using the input reproducing apparatus identification code; and recording the modified decode function onto the record medium.

16. A function recording method according to claim 15 further comprising the processes of:

receiving the set of the record medium identification code and the decode function from an external apparatus; and adding the received set of the record medium identification code and the decode function to the storage device.

* * * * *